United States Patent [19]

Hesse et al.

[11] 4,350,800
[45] Sep. 21, 1982

[54] PROCESS FOR THE PREPARATION OF SYNTHETIC RESINS BASED ON RESORCINOL COMPOUNDS

[75] Inventors: Wolfgang Hesse, Wiesbaden; Franz Landauer, Frankfurt am Main; Klaus Schmiedel, Königstein, all of Fed. Rep. of Germany

[73] Assignee: Hoechst Aktiengesellschaft, Frankfurt am Main, Fed. Rep. of Germany

[21] Appl. No.: 302,024

[22] Filed: Sep. 14, 1981

[30] Foreign Application Priority Data

Sep. 17, 1980 [DE] Fed. Rep. of Germany ....... 3034948

[51] Int. Cl.³ .................... C08G 8/04; C08G 8/20; C08G 8/22; C08G 8/24
[52] U.S. Cl. .................... 525/480; 525/501; 525/503; 525/509; 525/516; 525/137; 525/143; 525/497; 528/125; 528/128; 528/137; 528/140; 528/143; 528/144; 528/147; 528/153; 528/155; 528/165

[58] Field of Search ............... 528/153, 155, 125, 128, 528/137, 144, 147, 140, 143, 165; 525/480, 503, 509, 516, 501

[56] References Cited

U.S. PATENT DOCUMENTS

| 4,018,739 | 4/1977 | Okamoto et al. | 528/155 X |
| 4,216,088 | 8/1980 | Juferov et al. | 528/147 X |
| 4,259,473 | 3/1981 | Romey et al. | 528/139 X |
| 4,307,223 | 12/1981 | Shintani et al. | 528/212 |

Primary Examiner—Howard E. Schain
Attorney, Agent, or Firm—Hammond & Littell, Weissenberger and Muserlian

[57] ABSTRACT

A process for the preparation of synthetic resins based on resorcinol compounds which comprises reacting a resorcinol pitch which is obtained in the manufacture of resorcinol from benzenedisulfonic acid in at least one step with an oxo-compound selected from aldehydes, ketones and compounds based on or splitting off at least one of these substances, and the use of the products as binders for abrasive articles.

10 Claims, No Drawings

PROCESS FOR THE PREPARATION OF SYNTHETIC RESINS BASED ON RESORCINOL COMPOUNDS

In the preparation of resorcinol from benzene-disulfonic acid, a distillation residue of a black tar or pitch is obtained, the structure of which is not exactly known. It contains a minor amount of resorcinol, the major portion being self-condensation products of resorcinol or reaction products of compounds which are formed in the synthesis of resorcinol and which remain in the distillation residue because of their low volatility. The tar contains components having molecular weights between 500 and 2000, and the OH-number of the tar is between 600 and 850. This essentially indicates self-condensates of resorcinol. This viscous, sticky material is hard to handle and was hitherto a useless side-product, which is partially water soluble and must be disposed of at considerable expense because of the risk to the environment, using special refuse processes or incineration in order to prevent pollution of ground waters. The incineration of the resorcinol pitch also places a load on the environment because of the composition of the fumes and the soot content and is also associated with considerable technical and energy demands. There is therefore a need to find an economically interesting utilisation for resorcinol pitch, as well as to convert it into a form which causes little environmental damage.

It is also known that xanthine derivatives are formed under the conditions of distillation of resorcinol.

It is also known to produce thermosetting resins by (a) condensing aldehydes and by-product tar which is a meta-substituted phenol component from the production of resorcinol by reaction of hydroperoxide with m-diisopropylbenzene, and more than 1 mol of phenol, urea or melamine.

Novolak resins are obtained by reacting aldehydes and said by-product tar at 60°–150° C. in the presence of an acid catalyst or ortho-directed catalyst. The quantity of aldehyde is 0.4–0.9 equivalents per equivalent of aromatic ring of the tar. 100 parts of resin have 10–15 parts hexamethylene-tetramine added and it is said that this product cures to a material with good alkali resistance and electric insulating property. Alternatively, resol resins are obtained by reacting the raw material at 50°–100° C. in the presence of an alkali catalyst, with 1–2.5 equivalents of aldehyde per equivalent of aromatic ring of tar (Japanese openlaid specification No. Sho-54-154494).

Obviously this tar is of quite another composition than that obtained in the manufacture of resorcinol from benzene disulfonic acid. Thus, it is apparent from the foregoing statement that the phenolic component contained in the tar has only a limited reactivity which corresponds to that of a normal phenol; for in order to prepare resol resins, 1–2.5 equivalents of aldehyde have to be reacted in the presence of an alkali catalyst at 50°–100° C. with the tar, while it is known that storable resols cannot be prepared from resorcinol itself; moreover such resols can neither be prepared from the tar obtained in the manufacture of resorcinol from benzene disulfonic acid. These latter two reactants yield, even at ambient temperature, crosslinked products, i.e. resites. Thus, it is apparent that the tar obtained in the synthesis of resorcinol by reaction of m-diisopropylbenzene with hydroperoxide is not comparable with the tar obtained in the synthesis of resorcinol from benzene disulfonic acid.

The invention now results in a reasonable use of resorcinol pitch which is obtained in the manufacture of resorcinol from benzenedisulfonic acid by converting it into higher molecular synthetic resins.

According to the invention there is provided a process for the preparation of synthetic resins based on resorcinol compounds and oxo-compounds, characterised in that a resorcinol pitch which is obtained in the manufacture of resorcinol from benzenedisulfonic acid is reacted in at least one step with at least one oxo-compound selected from aldehydes, ketones and compounds based on, or splitting off, at least one of these substances.

Surprisingly, a synthetic resin is produced which may be easily handled. Meltable synthetic resins soluble in organic solvents may be formed, for example, which, if desired, may be hardened in an additional step by cross-linking with one or more appropriate substances, preferably with the above mentioned oxo-compounds, their derivatives or compounds which split off such oxo-compounds. It is possible to make use of the same compounds which are reacted in the first stage.

It is possible to effect the reaction in such a way that substantially completely cross-linked products are formed which are only partially soluble.

According to a further embodiment of the invention, synthetic resins of the novolak type may also be produced which are soluble and cannot be cross-linked and which have melting points substantially above room temperature.

Examples of oxo-compounds in the form of aldehydes which may be used in the invention include acetaldehyde, furfural, but preferably however formaldehyde. A convenient ketone is acetone. Examples of compounds which may be used which are based on oxo-compounds include phenolic resins, that is resols or combinations of novolaks and aldehydes based on monohydric mono- and/or polynuclear, substituted and/or unsubstituted phenols, such as diphenylolpropane or -methane, and especially alkyl phenols, such as butyl phenol, octylphenol, nonylphenol or dodecylphenol. Furthermore, there may be conveniently used amine resins, such as for example, melamine resin, guanamine resin, dicyanodiamide resin or urea resin, which, like the resols, may be etherified with alcohols, such as monohydric alcohols having 1 to 4 carbon atoms. Even though the etherification may lower the rate of reaction of the aminoplast with the resorcinol pitch, the etherification often results in better compatibility of the reaction materials with each other or better compatibility with third substances.

Examples of further compounds based on oxo-compounds include paraformaldehyde and trioxane, and an example of a compound which may be split to form an oxo-compound is hexamethylenetetramine.

In general, the reaction is effected at a temperature between room temperature and 300° C., advantageously between 40° C. and 200° C., and preferably between 50° and 150° C., the particular temperature employed depending on the desired resin. Thus, when a partially cross-linked reaction product is required, it is convenient to work in the range 40° to 200° C. The product obtained can then, if necessary, for example in the presence of hexamethylenetetramine, be hardened at a higher temperature of 100 to 200, preferably 110° to 140° C. For many purposes, however, it may be left in an unhardened state. If, on the contrary, a substantially cross-linked product is required, the reaction is conveniently effected at 40° to 100° C., preferably 50 to 90° C. In a two stage process, the first stage is effected, for example with a resol, in general at 80° to 200° C., conveniently 100° to 160° C. and preferably at 120° to 140° C. with formation of a soluble product, whereafter a further reaction with a resol is effected in a second stage.

In principle, the reaction may be effected without a catalyst in view of the high reactivity and rate of reaction of resorcinol pitch. In some cases, however, it may be desired to work in the presence of a catalyst. Catalysts which may be used in the process include, for example, mineral acids such as sulphuric acid, hydrochloric acid or phosphoric acid, as well as lower carboxylic acids such as formic acid, acetic acid, oxalic acid, lactic acid and tartaric acid; bases such as alkali metal or alkaline earth metal hydroxides, for example of calcium, barium and magnesium; salts of these metals and of transition metals with the above-mentioned or other acids, such as the acetates, octoates or napthenates of zinc, cadmium, copper and the like.

The reactivity of the resorcinol pitch used according to the invention to oxo-compounds or compounds based on oxo-compounds is essentially similar to the high reactivity of resorcinol. However, in comparison to monofunctional phenols and resins thereof it has the advantage of a higher reactivity with oxo-compounds, particularly with formaldehyde. In the reaction of resols with the resorcinol pitch used according to the invention it is possible to reduce the high reactivity of resorcinol pitch to formaldehyde, especially when working with an excess of the resol, by substituting the reactive nuclear hydrogen atoms of the resorcinol pitch substantially or totally by the phenol resin with the result that—possibly a totally cross-linked—product with higher molecular weight is produced.

In one embodiment of the invention, 5 to 100, and preferably 10 to 60 g of resorcinol pitch are reacted per mol phenol contained in the resol. However, when using formaldehyde, generally 200 to 800 g, preferably 300 to 600 g of resorcinol pitch are reacted per mol formaldehyde. The optimum proportion can be empirically determined. When it is desired to produce an un-cross-linked product, a smaller amount of phenol resin may be used and a shorter reaction time selected. In this case, the high reactivity of the resorcinol pitch to formaldehyde remains unaffected so that the product need not be further reacted until it is used. In this way the resorcinol pitch can also be reacted with amine resins, whereby the resorcinol pitch is used in an amount of from 100 to 1200 g, preferably from 200 to 1000 g per mol of the aldehyde, preferably formaldehyde, which is to be reacted with resorcinol pitch.

The reaction can if desired be effected in the presence of a solvent, e.g. in water or organic solvents such as toluene, xylene, ethanol, the propanols or butanols and the like; or as a melt. Although it is not generally necessary to work under excess pressure, the reaction may also be effected under higher pressure.

The invention enables the preparation of resins distinguished by their valuable properties. They exhibit a high thermal and chemical stability, good water resistance and also a resistance to boiling water. Thus they are substantially less susceptible to water than synthetic resins based on resorcinol. The reduced volatility, compared with resorcinol, makes the resorcinol pitch easier to process. Thus, heating does not result in the formation of undesired fumes as in the reaction of resorcinol. In addition, in the first stage of the reaction with formaldehyde, less formaldehyde is required as cross-linking agent than is the case with resorcinol. A particular advantage of the invention is that the products contain no free formaldehyde. This is also the case when the resorcinol pitch or the product obtained in the first stage is reacted with a resin which still contains free formaldehyde. In this way, a product free from noxious substances is obtained.

As a result of the modification of the product with phenolic and/or amine resins it is possible to adjust, if necessary, its compatibility with other substances and its solubility, to any desired extent. According to the reaction conditions and starting materials, such resins may be water soluble, soluble in ammonia or alkalis, and, especially when alkyl-substituted resols are used as starting materials, possess hydrophobic properties.

In view of their good properties, the products obtained according to the invention may be used in diverse applications. Thus, for example, they may be used as binding materials in the preparation of hardenable moulding materials; adhesives e.g. for wood glues; coatings (optionally water soluble coatings); impregnating agents and binders for fibres and other materials; in the preparation of fleeces of natural or synthetic fibres, mineral or glass-wool; and in the manufacture of grinding wheels and abrasives. In the rubber art, the new resins may be used as reinforcing resins with higher reactivity to hexamethylenetetramine, as tackifiers or as adhesion promoters.

The suitability of the products according to the invention as adhesives is particularly surprising. It is not possible to obtain similar adhesive dispersions based on polyvinyl acetate with resorcinol resins or resorcinol. The addition of aqueous alkaline or aqueous solutions of these substances immediately results in coagulation. This is not the case with condensates of resorcinol pitch. The proportion of polyvinyl acetate dispersion in the combination amounts to, for example, 50 to 95, and of the resorcinol resin according to the invention 50 to 5 parts by weight (based on the solids content).

Wood glues prepared with modified polyvinyl acetate dispersions of this kind are resistant to boiling water according to DIN 68 602/603.

It is also possible to prepare adhesive resins for contact adhesives, based, for example, on an adhesive resin of an alkylphenol resin (resol) such as butylphenol-formaldehyde-resin, reacted with up to 3% by weight of resorcinol pitch.

The process according to the invention may also be employed where it is desired to dispose of resorcinol pitch without problems, by converting it into a water insoluble form.

In the following examples, T represents parts by weight and % represents percent by weight. The B-time was determined according to DIN 16 916 and the viscosity was measured in ethylene glycol monoethyl ether (50%) at 20° C.

EXAMPLES (1) 400 T of a resorcinol pitch with a hydroxyl number of 738 was melted in a reaction vessel equipped with a thermometer, stirrer, reflux condenser and descending condenser, and was heated to 125° C. 81 T of aqueous formaldehyde (37%) was added dropwise. The mixture is boiled under reflux for ½ hour. The temperature then falls to 115° C. Distillation then yields 67 T of an aqueous distillate from the descending condenser. This contains no formaldehyde. 410 T of synthetic resin are left in the reaction vessel. Characteristics: melting point 90° C., residue (1h/135° C.) 99.5%, viscosity 4500 mPa.s.

This resin is well suitable for the preparation of abrasive articles.

A 50% solution of this resin in n-butanol was mixed with 5% hexamethylenetetramine and stirred until everything dissolved. The B-time at 120° C. was 2 minutes.

10 T of the cross-linked resin was ground in a mortar; 100 T of water were added thereto at room temperature and allowed to stand for 24 hours. The supernatant water remains clear. A low bromine consumption indicates a minor amount of water soluble undefined phenols. This hardened resin may be disposed of without difficulty.

(2a) Preparation of resins

470 T of phenol and 240 T of aqueous sodium hydroxide (33%) were placed in a reaction vessel equipped with a thermometer and stirrer and heated to 50° C. When this temperature was reached, 198 T of paraformaldehyde (91%) was added over 1 hour in 10 portions and the reaction mixture stirred at 60° C. until the formaldehyde content after 4 hours amounts to 0.25%. A mixture of 440 T of resorcinol pitch and 60 T of water were then added, and the reaction mixture stirred at 80° C. until the viscosity rises from 550 mPa.s to 1500 mPa.s (3 hours). The obtained aqueous synthetic resin solution is easily miscible with water. It is also miscible with other phenolic resins.

This solution may be used, after mixing with another resol based on phenol, cresol and formaldehyde which still contains about 3% of free aldehyde, in order to use up the free formaldehyde therein. A mixture of 1 T of the resin solution according to Example 2a and 4 T of this phenol resol exhibits a pot time of 60 hours. ½ Hour after preparation of the mixture, no free formaldehyde can be detected in the resin mixture. The rate of hardening of the mixture is substantially increased compared to the starting resol. While the B-time of the resol is 13.5 min/120° C., after addition this is shortened to 6 min/45s.

(2b) Use of the products.

The resin obtained according to (2a) is mixed with a polyvinyl acetate dispersion (50%) in a proportion of 20:80. A smooth, readily spreadable dispersion without perceptible separation is obtained having a pot life of 6 hours. This dispersion may be used as a hot water resistant adhesive for wood according to DIN 68 602/603.

In comparison, the admixture of resorcinol or an aqueous alkali resorcinol resin solution with the above mentioned dispersion results in immediate coagulation.

(3) 400 T of resorcinol pitch are melted in an apparatus equipped with a thermometer, stirrer, device for azeotropic distillation and a descending condenser and 270 T of a 60% solution of commercial dimethylol-para-nonyl-phenol in xylene are added thereto, and are then heated to 150° to 160° C. while recycling the solvent. 35 T of water are thereby separated. After completion of the water separation, the solvent is distilled off under atmospheric pressure until a temperature of 220° C. is reached. By maintaining the residue for an hour at reduced pressure, the remaining volatile components are removed. 575 T of a completely water-insoluble synthetic resin remain. Characteristics: viscosity 1350 mPa.s.; melting point 70° C., soluble in butanol and other solvents having comparable polarity and in methylene chloride.

(4) 400 T of a resorcinol pitch having a hydroxyl number of 702 were placed in a reaction vessel equipped with a thermometer, stirrer, descending condenser and measuring device and were heated to 180° C. 30 T of a commercial hexamethoxy methyl melamine were added over half an hour and the methanol formed was distilled off. Yield: 418 T of resin. Characteristics: melting point 94°/96° C., viscosity 3200 mPa.s.

A 50% solution of this resin in n-butanol was mixed with 6% hexamethylenetetramine and stirred until fully dissolved. The B-time was 2 minutes/120° C.

(5V) Comparison (5a) Preparation of the resin

440 T of resorcinol, 50 T of distilled water and 2.5 T of 10% sulphuric acid were mixed together in a reaction vessel as used in Example 1 and heated to 125° C. 211 T of a 37% aqueous solution of formaldehyde was then added over 45 minutes. The reaction temperature fell from 125° to 118° C. 45 Minutes after the completion of the addition of the aqueous formaldehyde solution the reaction was ended.

An aqueous resorcinol resin solution was obtained in a quantitative amount; residue (1h/135° C.) 70%, viscosity 1700 mPa.s.

(5b) Use of the product

The resin was employed as in Example (2b). However, when the resorcinol-formaldehyde condensation product was mixed with the dispersion, coagulation resulted. It was therefore impossible to use the resin for this purpose.

What is claimed is:

1. A process for the preparation of synthetic resins which comprises reacting a resorcinol pitch which is obtained in the manufacture of resorcinol from benzenedisulfonic acid in at least one step with at least one oxo-compound selected from the group consisting of aldehydes, ketones and compounds based on or splitting off at least one of these substances.

2. Process as claimed in claim 1 wherein resorcinol pitch is reacted with an oxo-compound selected from the group consisting of formaldehyde, an unsubstituted phenol resin, an at least partially alkylated phenol resin, an amino resin and hexamethylenetetramine.

3. A process as claimed in claim 1 wherein the reaction is performed at a temperature between ambient temperature and 300° C.

4. A process as claimed in claim 1 wherein between 5 and 100 g of resorcinol pitch are reacted per mol phenol of a resol.

5. A process as claimed in claim 1 wherein between 200 and 800 g of resinol pitch are reacted with one mol of formaldehyde.

6. A process as claimed in claim 1 wherein in a first step the resorcinol pitch is reacted with a resol between 80° and 200° C. to form a soluble product product which is subsequently reacted with a resol in a second step.

7. A process as claimed in claim 1 wherein the reaction is performed in the presence of a catalyst selected from the group consisting of a mineral acid, a low-molecular carboxylic acid, an alkaline metal hydroxide, an alkaline earth metal hydroxide, a salt of said metals with a low-molecular carboxylic acid.

8. A process as claimed in claim 1 wherein the resorcinol pitch is reacted with a phenol resin such that the reactive hydrogen atoms attached to the nuclei of the resorcinol pitch are at least partially substituted with a phenol resin.

9. A process as claimed in claim 1 wherein a resorcinol pitch is reacted in at least one step with at least one oxo-compound selected from the group consisting of aldehydes, ketones and compounds based on or splitting off at least one of these substances and wherein the reaction is performed between ambient temperature and 300° C. wherein the components are reacted per se or in the presence of a catalyst and wherein between 5 and 100 parts by weight of the resorcinol pitch are reacted per mol phenol of a resol.

10. An abrasive article containing a product prepared according to the process as claimed in claim 1 as a binder.

* * * * *